UNITED STATES PATENT OFFICE.

JAMES EDWARD PORTER, OF SYRACUSE, NEW YORK, ASSIGNOR TO THE JUST MINING & EXTRACTION COMPANY, OF SYRACUSE, NEW YORK, A CORPORATION OF NEW YORK.

PROCESS OF TREATING REFRACTORY SULFID ORES.

1,002,447.     Specification of Letters Patent.     Patented Sept. 5, 1911.

No Drawing.     Application filed January 17, 1910. Serial No. 538,402.

*To all whom it may concern:*

Be it known that I, JAMES E. PORTER, a citizen of the United States, residing at Syracuse, in the county of Onondaga and State of New York, have invented certain new and useful Improvements in Processes of Treating Refractory Sulfid Ores, of which the following is a specification.

This invention relates to the treatment of ores by the cyanid process, and more particularly to the treatment by this process of refractory sulfid ores containing silver, or both gold and silver, the latter usually predominating, and to the treatment of sulfid ores containing silver and copper with or without gold, such ores in their raw state being unsuited for profitable or commercial treatment by any known process.

The commonly accepted equation for the reaction between potassium cyanid and silver sulfid is as follows:

(1)    $4KCN + Ag_2S = 2KAg(CN)_2 + K_2S$, the reaction not requiring the presence of oxygen. A comparison of the molecular weights involved shows that it requires 260.44 parts of potassium cyanid to dissolve 215.76 parts of silver, or in other words one pound of potassium cyanid is necessary for the solution of 0.83 pound or about 13 ounces avoirdupois of silver. It is not possible however, under ordinary conditions, to effect the continued solution of silver in accordance with the above equation, for the reason that after a certain amount of silver has been dissolved an equilibrium is reached and the solution ceases. No matter what the source or nature of the soluble sulfids, when they have accumulated in solution to a certain extent the above reaction ceases; and when they predominate, the silver which has been dissolved may be reprecipitated, the reaction being reversible, thus:

(2)    $K_2S + 2KAg(CN)_2 = 4KCN + Ag_2S$.

Of course the amount of free cyanid influences this reaction, but it has been shown that a 0.5% solution of potassium cyanid (containing ten pounds of KCN per ton of solution) is capable under the usual conditions of practice of dissolving less than one-half ounce of silver per ton. The disturbing factor in all such operations is the soluble sulfid, and inasmuch as it is necessarily formed by reaction with sulfid ores, and is also introduced at times with the lime or otherwise, its presence is unavoidable. The failure successfully to treat sulfid ores by the cyanid process is attributable largely to this contamination or fouling of the solutions, whereby their solvent power after a short period of use becomes practically *nil*. According to the present invention, however, such refractory sulfids are economically and efficiently treated by cyanid solutions, the solvent power of the solution being maintained by the conversion of the sulfids, by a process of oxidation, to thiosulfates, which are not only not injurious to the cyanid, but are capable by virtue of their known solvent powers of supplementing its action. Alkali sulfids in aqueous solution are first oxidized on exposure to air to the disulfid, according to the equation:

(3)    $2K_2S + H_2O + O = K_2S_2 + 2KOH$.

Continued action of the air tends to the formation of still higher sulfids as follows:

(4)    $3K_2S_2 + H_2O + O = 2K_2S_3 + 2KOH$, and (5)    $4K_2S_3 + H_2O + O = 3K_2S_4 + 2KOH$, and finally the sulfid may be completely oxidized, yielding thiosulfates and hydroxids. Omitting the intermediate steps, the formation of the thiosulfate from the monosulfid may be represented thus:

(6)    $2K_2S + H_2O + 2O_2 = K_2S_2O_3 + 2KOH$.

It will be seen from the above considerations that a moderate aeration or a slow or weak oxidizing action is quite ineffectual, resulting merely in the production of polysulfids which are quite as detrimental to the solvent action of the cyanid solution as the monosulfid; but that an energetic oxidizing action, or one which is sufficient to convert the soluble sulfids into thiosulfates, effects a complete restoration of the solvent powers of the cyanid and imparts to the solution the additional solvent qualities of the thiosulfate. The present process contemplates the continuous oxidation of the soluble sulfids and the maintenance thereby of the efficiency of the solution. This sufficient or complete oxidation may be secured by the use of various reagents familiar to those skilled in the art, but I have found that under proper conditions the oxidation may be effected by the use of air and I now regard this method as preferable. To secure proper results the following conditions are regarded as essential: (1) The ore should be very finely ground, say 95% or more to pass through a 150 mesh screen; (2) the ore should be maintained in suspension in the cyanid solution; (3) oxidizing conditions must be maintained without intermission in the solution, preferably by distributing air therethrough in the form of minute bubbles, thoroughly permeating the mass and capable of remaining in suspension in the liquid for comparatively long periods instead of rising quickly to the surface. It is preferred that the temperature of the solution should be comparatively high, and a definite maximum effect has been observed at temperatures of 180° to 190° F. It will be understood however that time and temperature are in this case, as in most chemical reactions, to some extent convertible factors, and that a treatment for a longer time at a lower temperature may suffice. I do not desire therefore to restrict myself to any specific temperature. Under the best conditions as above pointed out the operation proceeds very rapidly, a few hours being usually sufficient to secure a commercially complete extraction of the values. Under these conditions it is found impossible for the soluble sulfids to exist in the solution for any considerable length of time, their oxidation following closely their formation, and it is therefore impossible that an equilibrium should be reached, as according to the laws of mass action the soluble sulfids must predominate to give this result. By reason of the rapid elimination of the sulfids the cyanid will at all times exert its proper solvent effect according to equation (1), the reverse equation, (2), being impossible. The other product of the reaction, potassium hydroxid, is also of value in maintaining the necessary alkalinity of the cyanid solution: since compounds of arsenic, antimony, etc., are without appreciable action on the cyanid solution in the presence of free alkali, the importance of continuously regenerating the alkali is obvious. No inert decomposition products remain in the cyanid solution, and the constant formation of compounds capable in themselves of dissolving the values maintains the solvent conditions very nearly constant, if not indeed improving them, throughout the process.

The process may be carried into effect in apparatus of various types, that of U. S. Patent No. 887,268, issued May 12, 1908, to J. E. Porter and A. L. Clark, being well adapted for the purpose when the aeration is effected by means of air.

A consideration of equation (6) shows that for every 216 parts of silver dissolved from the sulfid, 32 parts of oxygen are required to keep the solution free from sulfids, assuming the silver sulfid to be their only source. An air contains only about 21% of oxygen approximately 152 parts of air, by weight, will be required for this amount of silver. The other sources of sulfids considered, the necessity of efficient aeration is obvious. The mere introduction of air into the body of pulp for the purpose of effecting a violent agitation of the mass, or the exposure of films of the solution to the atmosphere, are quite inadequate, it being necessary that the solution should be completely permeated by air, slowly, gently, uniformly and constantly permeating the entire mass in such manner that each minute particle of ore is constantly jacketed by a layer of thoroughly aerated liquid and continuously subjected to oxidizing conditions.

I claim:

1. The process of treating refractory sulfid ores containing gold and silver, which consists in maintaining the ore previously reduced to a state of extreme subdivision in suspension in a heated cyanid solution, and maintaining oxidizing conditions in said solution, the conditions being so adjusted that the sulfur of the ore is converted into thiosulfate.

2. The process of treating refractory sulfid ores containing gold and silver, which consists in maintaining the ore previously reduced to a state of extreme subdivision in suspension in a heated cyanid solution, and distributing air in minute subdivision through said solution to maintain oxidizing conditions therein, the conditions being so adjusted that the sulfur of the ore is converted into thiosulfate.

3. The process of treating refractory sulfid ores containing gold and silver, which consists in maintaining the ore previously reduced to a state of extreme subdivision in suspension in a cyanid solution, and distributing air in minute subdivision through said solution to maintain oxidizing conditions therein, the conditions being so adjusted that the sulfur of the ore is converted into thiosulfate.

In testimony whereof, I affix my signature in presence of two witnesses.

JAMES EDWARD PORTER.

Witnesses:
E. E. CARPENTER,
MICHAEL A. CAHILL.

Copies of this patent may be obtained for five cents each, by addressing the "Commissioner of Patents, Washington, D. C."